Aug. 26, 1958    L. B. McCRACKEN, SR    2,848,741
APPARATUS FOR FEEDING POWDERED OR
GRANULAR MATERIALS TO RECEPTACLES
Filed Dec. 27, 1955    3 Sheets-Sheet 1

INVENTOR.
LEO B. MC CRACKEN SR.
BY Donald J. Petrich,
AGENT

Aug. 26, 1958
L. B. McCRACKEN, SR
2,848,741
APPARATUS FOR FEEDING POWDERED OR
GRANULAR MATERIALS TO RECEPTACLES
Filed Dec. 27, 1955
3 Sheets-Sheet 3
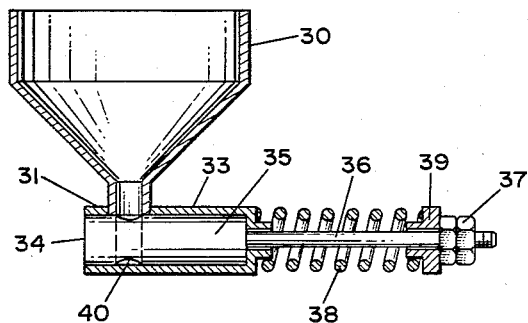
*Fig-3*
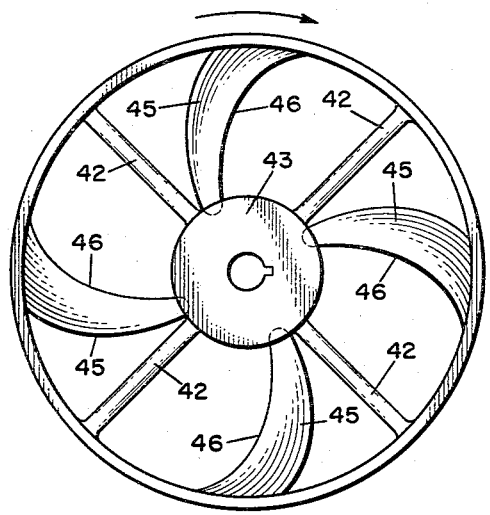
*Fig-4*
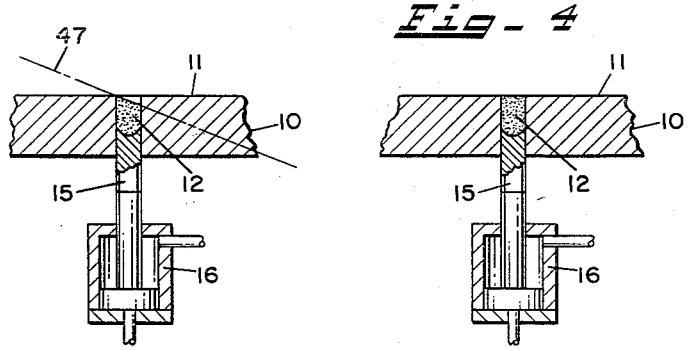
*Fig-5*   *Fig-6*
INVENTOR.
LEO B. MC CRACKEN SR
BY 
AGENT

United States Patent Office 2,848,741
Patented Aug. 26, 1958

2,848,741

APPARATUS FOR FEEDING POWDERED OR GRANULAR MATERIALS TO RECEPTACLES

Leo B. McCracken, Sr., Columbus, Ohio, assignor, by mesne assignments, to American Brake Shoe Company, New York, N. Y., a corporation of Delaware Application December 27, 1955, Serial No. 555,562

2 Claims. (Cl. 18—30)

This invention relates to apparatus for feeding or filling receptacles with granular or powdered materials.

Certain articles, such for example, as grinding wheels, medical tablets, suppositories, and the like, are manufactured by filling a die with granular or powdered material and then compressing the material into solid form by forcing a punch into the filled die. In the case of grinding wheels, the pressed wheels are removed from the die and baked, but certain medicinal articles are completely manufactured by the pressing operation.

Articles such as those set forth above are usually produced with great rapidity on automatically operated presses and when such articles are being manufactured it is important that the die, or dies, in which they are formed be charged or filled between each stroke of the press ram and punch with a definite quantity of powdered material in order that the weight of each of the finished products will be equal. It is also important particularly in the manufacture of articles such as exemplified by grinding wheels, that the die be filled in such manner that the pressed product will be of uniform density and shape throughout. The main object of this invention is, therefore, to provide improved apparatus for filling a die or dies in the manner set forth above.

In carrying out the main object, it is a further object of the invention to provide an improved apparatus whereby a supply of granular or powdered material is moved over the die to fill it and wherein at least one rotating cutting edge, while rotating, is then slid across the mouth of the die to slice the material off substantially in the plane of the die mouth.

Further objects and advantages of the present invention will be apparent from the following description, reference being had to the accompanying drawings wherein a preferred form of embodiment of the invention is clearly shown.

In the drawings:

Fig. 3 is a view in section through a material hopper and metering mechanism of the apparatus;

Fig. 4 is a view in plan of the rotary material container and cut-off wheel of the apparatus;

Fig. 5 is a view in section showing a die which has been filled with material by a prior art device, and Fig. 6 is a view similar to Fig. 5 but showing a die which has been filled with powdered material by the improved apparatus shown in Fig. 1 of the drawings.

Figure 1:
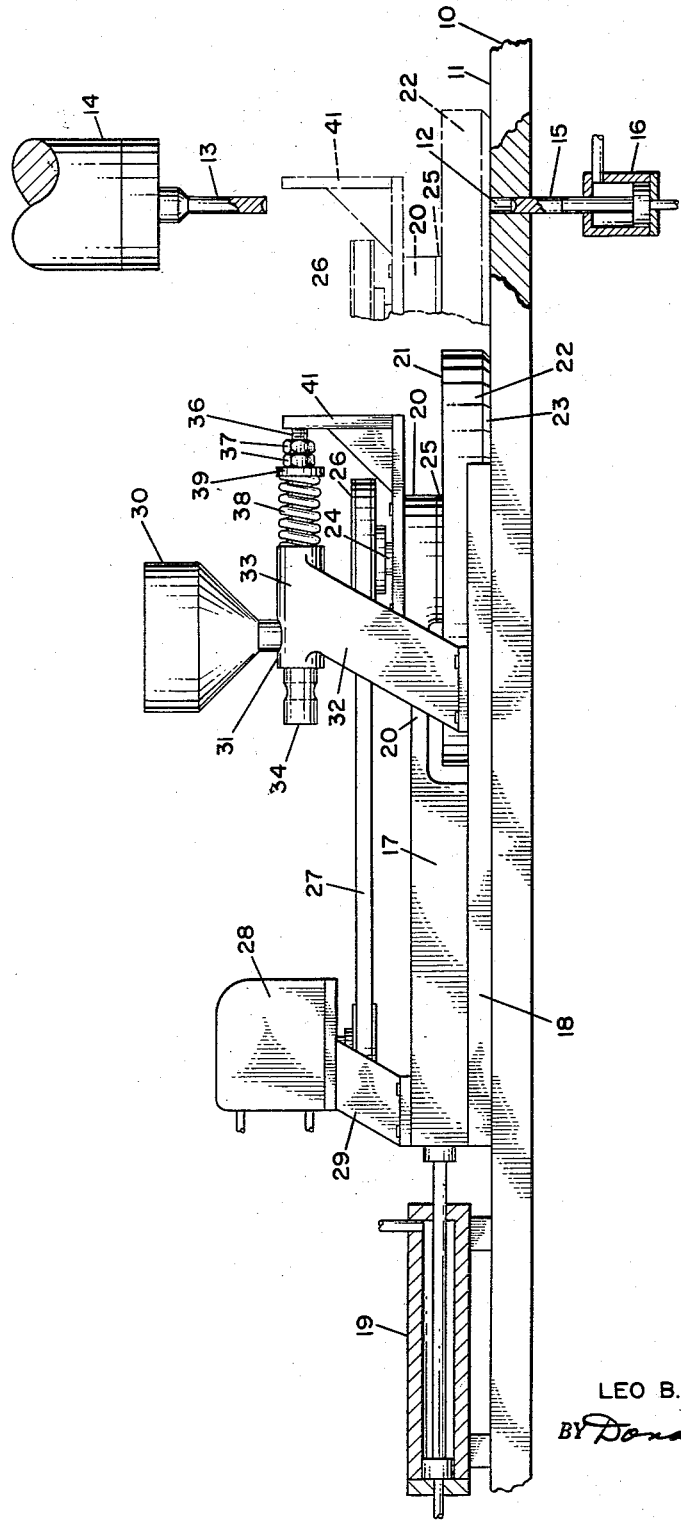
Fig. 1 is a side view of a feeder for granular or powdered materials which includes the features of the invention, the apparatus being shown partly in section and partly in elevation and with certain parts illustrated diagrammatically.

Fig. 1 of the drawings shows a complete material feeding and cut-off mechanism for charging or filling a die with granular or powdered material. This apparatus includes a bed plate 10 which has a flat or plane top surface 11 and through which there extends a bore which forms a die cavity 12 having a mouth which opens through the top flat or plane surface 11 of the plate 10. The die is here shown as being formed directly in the bed plate 10, but it is to be understood that it may be formed by an insert held in the bed if desired.

The bed plate 10 of the feeder is adapted to be mounted upon the bed, not shown, of a hydraulic press, for example, with the die 12 vertically aligned with a punch 13 carried by the ram 14 of said press. The die 12 is closed at its bottom by a second punch 15 which extends into the die 12 and has a concave end which forms the bottom of the die 12. Punch 15 functions as an ejector for forcing a compressed article from the die 12 and this punch is operated by a double acting hydraulic motor 16 which may be a part of the hydraulic press, not shown, upon which the feeder apparatus is mounted.

The feeder apparatus includes a carrier in the form of a slide 17 that is carried by and reciprocates between a pair of spaced guides 18 secured on the top of bed plate 10. A double acting hydraulic motor 19 of the piston and cylinder type is provided for reciprocating the slide 17.

The carrier or slide 17 includes an integral arm 20 which carries a wheel 21 provided with a rim 22 one side of which provides an annular cutting or knife edge 23 which slides upon the upper flat or plane surface 11 of bed plate 10. Wheel 21 is mounted upon and driven by a shaft 24 the central axis of which extends upwardly and which shaft is bearinged for rotation in a bushing mounted in the arm 20 of carrier or slide 17. A suitable bearing plate in the form of a spacer 25 is interposed between the hub of wheel 21 and the arm 20 and the upper end of shaft 23 carries a sheave 26 through which the shaft is rotated by a belt 27 and a rotary hydraulic motor 28 carried by a bracket 29 mounted upon the top of carrier or slide 17.

The rim 22 of wheel 21 cooperates with the flat or plane upper surface 11 of bed plate 10 to provide a container for granular or powdered material which is to be fed into the die 12 and material is supplied intermittently to this container in measured or metered quantities from a hopper 30 of a measuring or metering device 31 which is rigidly mounted to the bed plate 10 through the guides 18 and a bracket 32.

The metering device 31 includes a housing which forms the hopper 30 and a cylinder portion 33 therebelow in which a plunger 34 reciprocates. Plunger 34 is comprised of a cylindrical body portion 35 and a reduced diameter extension or shaft 36 which extends through an end wall of the cylindrical portion 35 and is threaded at its free end to receive a pair of nuts 37. A compression spring 38 surrounds shaft 36 and abuts the said cylinder end wall and a collar 39 on shaft 36 to urge the plunger 34 to the position shown in Fig. 3 of the drawings. The body portion 35 of plunger 34 includes a measuring or metering bore or chamber 40 which is aligned with the bottom opening of the funnel-like hopper 30 and receives material therefrom when the plunger 34 is seated, as shown in Fig. 3, in the cylinder 33. When the plunger is forced to the left, the chamber 40 is extended to a position to the left of the cylinder 33 whereby the contents of the chamber 40 will fall into the wheel 21. When the plunger 35 is in this last named position, the bottom of the hopper is, of course, closed by the body portion 35 of the plunger 34. The plunger 34 is operated by a bracket 41 carried by the arm 20 of the carrier or slide 17.

Figure 2:
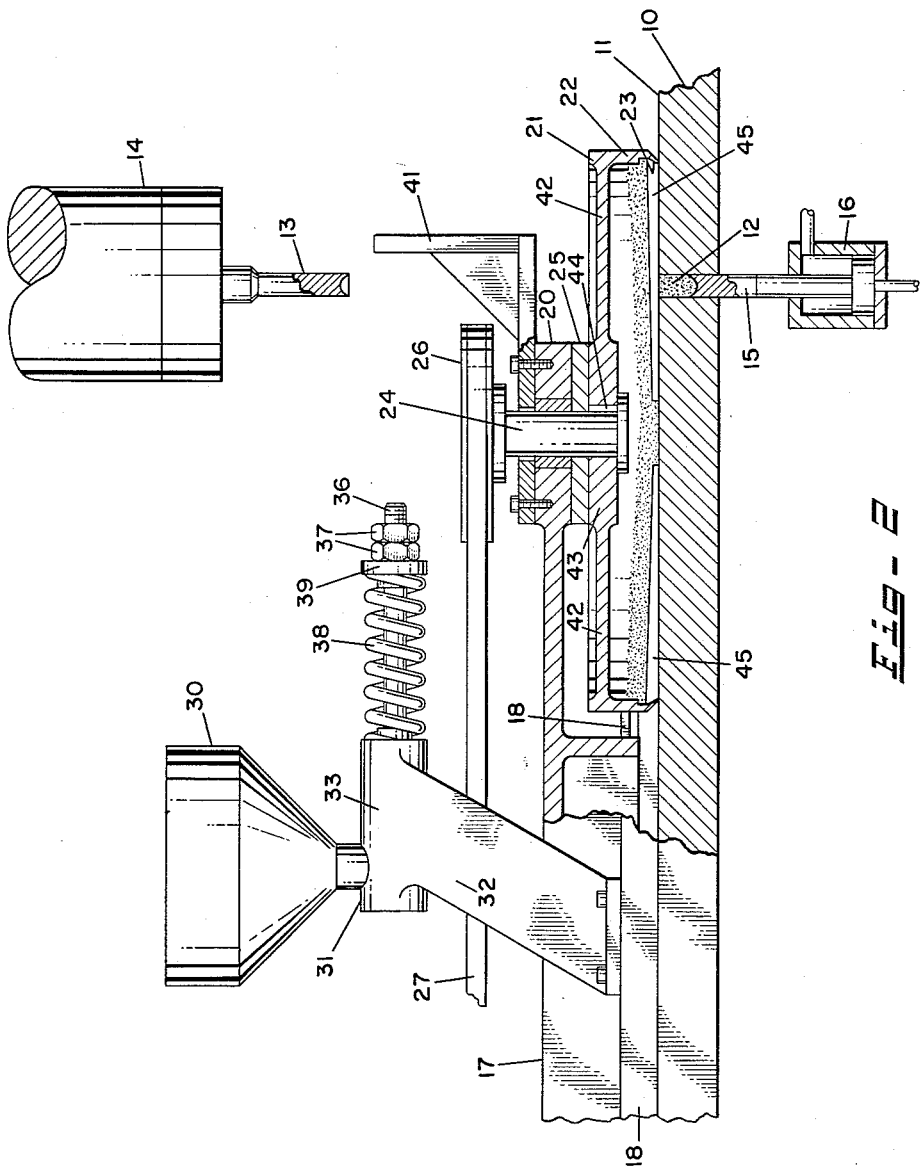
Fig. 2 is a view on a larger scale of part of the apparatus seen in Fig. 1 with portions broken away to show internal features of construction of the apparatus.

The wheel 21, as shown in Figs. 2 and 4 of the drawings, includes the rim or upright wall 22 and four spokes 42 which extend radially from a hub 43 to the rim adjacent its top. The shaft 24 previously referred to extends through this hub and is keyed thereto by a key 44. As previously mentioned, the bottom of the rim 22 provides an annular cutting or knife edge 23 and as clearly seen in Fig. 2 of the drawings, this annular edge slopes downwardly and inwardly whereby it will have a slicing action as it rotates and passes over the mouth of the die 12. The wheel 21 also includes four knife blades 45 which extend radially inwardly from the rim 22 and each of which is provided with a generally arcuate cutting or knife edge 46 which slides upon the flat or plane top surface 11 of bed plate 10. These blades 45 function to agitate material contained within the material container formed by the rim 22 and the top 11 of bed plate 10 as the wheel 21 is rotated in the direction of the arrow seen in Fig. 4.

In the operation of the apparatus above described, the wheel 21 is partially filled with the granular or powdered material from which it is desired to form objects in the die 12. The motor 28 is then energized to rotate the wheel 21 and motor 19 is operated to cause the wheel 21 to pass over the die 12 thereby sliding the material along the top flat or plane surface 11 of the bed plate 10 and across the die 12 whereupon material from within the container formed in part by the rim 22 will fill the die 12. The agitation of the material within the container together with the repeated passing of the blades 45 across the mouth of the die and the trowling and cutting action thereof will cause the die to be filled properly with material and when the wheel is slid over the bed plate 10 by the motor 19 to cause the rim to pass over the die mouth the knife edge 23, which is rotating while being passed rectilinearly thereover, will slice the material off in the plane of the flat top or plane surface 11 of the bed plate 10 thereby insuring that the die will be filled to a perfect level and will, each time it is filled, have the proper quantity of material placed into it.

Prior devices are known for feeding material into dies such as the die 12, however these devices attempt to cut the material off at the die mouth by a pure shearing action which results in tearing or scraping some of the material out of the die to a plane such as indicated by the line 47 in Fig. 5. In the present invention, such action is prevented because the cutting edges are being rotated while being moved rectilinearly across the mouth of the die and therefore the die will be properly filled each time the wheel 21 and the cutting edges provided thereon pass across the die mouth. When the die is filled as above described after each operation or stroke of the ram 14 and punch 13, articles of uniform density, shape and weight will be produced.

The measuring or metering device 31 is caused to transfer a quantity of material from the hopper 30 to the interior of the wheel 21 which is equal to the capacity of the die 12 each time the carrier or slide 17 is moved to the position shown in Fig. 1 thereby maintaining the proper quantity of material in the wheel 21.

While the form of embodiment of the present invention as herein disclosed constitutes a preferred form, it is to be understood that other forms might be adopted, all coming within the scope of the claims which follow:

I claim:

1. Apparatus for filling a die with granular material including means forming a bed having a flat upper surface, die means having a mouth opening through said flat surface, a rotary material container means including an annular knife edge in slidable relation with said flat surface, and means for rotating said container means while moving it across said die mouth whereby material will fill said die and be sliced off at the mouth thereof by said rotating annular knife edge in the plane of said flat surface.

2. Apparatus for filling a die with granular material including means forming a bed having a flat upper surface, die means having a mouth opening through said flat surface, a rotary material container means including an annular knife edge and blades extending generally radially inwardly therefrom, said knife edge being in slidable relation with said flat surface, and means for rotating said container means while moving it across said die mouth whereby material will fill said die and be sliced off at the mouth thereof by said rotating annular knife edge in the plane of said flat surface.

References Cited in the file of this patent

UNITED STATES PATENTS

| 563,186 | Kunkel | June 30, 1896 |
| 2,511,332 | Denison | June 13, 1950 |

FOREIGN PATENTS

| 818,450 | Germany | Oct. 25, 1951 |